Patented May 11, 1926.

1,584,173

UNITED STATES PATENT OFFICE.

ALBERT C. HOLZAPFEL, OF NEW YORK, N. Y.

ANTISEPTIC.

No Drawing.    Application filed December 5, 1925. Serial No. 73,484.

This invention relates to antiseptics, and more particularly to solutions of fluorine compounds suitable for use in anti-fouling compositions and as a wood preservative.

The antiseptic and toxic qualities of certain forms of fluorspar have been known and utilized for many years. Heretofore, the form used has been a watery solution which has been employed in the medical profession as an antiseptic and also employed for the preservation of wood.

My invention relates to the use of fluorides in antifouling compositions for which purpose they have eminent qualities.

I have found that fluorine compounds, and particularly fluorides dissolved in an oleic solution are particularly adapted for use in antifouling compositions. When such oleic solutions are combined with varnish or other vehicle carrying the pigments in such paints or compositions, the gradual process of disintegration of the vehicle releases the fluorides and they combine with the sea water, forming a thin film of antiseptic solution capable of destroying barnacles, algae, and the like, during the germ stage in which they try to fasten themselves to ships.

I have also found that the fluorides may advantageously be employed for the preservation of wooden piles, railroad ties, and the like, by forming solutions in oil and particularly fuel oil or other inexpensive oil of this character.

While various fluorides may be employed for the purpose, I prefer to employ sodium fluoride or ammonium fluoride. An oleic solution is formed by heating oleic acid to a boiling temperature and adding such quantities of the fluoride as are capable of being dissolved therein. I have found that the desired quantity of sodium fluoride may be dissolved in from 30 to 60 minutes, the heat being continued during the formation of the solution. In order to prevent the fluorides from precipitating or crystallizing out, I may then add either or any or all of the following substances, i. e., rosin or other gum, zinc oxide or caustic soda. By the addition of either, any or all of these, the solution is made viscid and precipitation or crystallization of the fluorides is prevented. The solution is then, during gradual cooling mixed with a paint varnish or paint oil, or other suitable vehicle, for making anti-fouling compositions when it is to be employed for the purpose of preventing marine growth. If the fluoride solution is to be employed for the purpose of preserving wood, it may be mixed with fuel oil or other oil capable of being used for wood impregnation.

In place of sodium or ammonium fluoride, other fluorides such as copper fluoride, mercury fluoride, zinc fluoride, lead fluoride, and antimony fluoride may be employed and those may be treated with oleic acid under heat or mixed cold with the paint vehicle.

While I have described in detail the preferred practice of my process, it is to be understood that the details of procedure may be widely varied without departing from the spirit of the invention or the scope of the subjoined claims.

I claim:

1. An antiseptic of the character described comprising a solution of a fluoride in oleic acid.

2. An anti-fouling composition comprising a paint vehicle and a solution of a fluoride in oleic acid.

3. An antiseptic of the character described comprising a solution of sodium fluoride in oleic acid.

In testimony whereof, I affix my signature.

ALBERT C. HOLZAPFEL.